(12) United States Patent
De Suza

(10) Patent No.: US 11,238,532 B2
(45) Date of Patent: Feb. 1, 2022

(54) INTELLIGENT LOAN QUALIFICATION BASED ON FUTURE SERVICING CAPABILITY

(71) Applicant: Grain Technology, Inc., Oakland, CA (US)

(72) Inventor: Patrick De Suza, Oakland, CA (US)

(73) Assignee: Grain Technology, Inc., Oakland, CA (US)

( * ) Notice: Subject to any disclaimer, the term of this patent is extended or adjusted under 35 U.S.C. 154(b) by 0 days.

(21) Appl. No.: 17/359,092

(22) Filed: Jun. 25, 2021

(65) Prior Publication Data

US 2021/0407000 A1 Dec. 30, 2021

Related U.S. Application Data

(63) Continuation-in-part of application No. 16/912,673, filed on Jun. 25, 2020.

(51) Int. Cl.
*G06Q 40/02* (2012.01)
*G06N 20/00* (2019.01)

(52) U.S. Cl.
CPC ........... *G06Q 40/025* (2013.01); *G06N 20/00* (2019.01)

(58) Field of Classification Search
None
See application file for complete search history.

(56) References Cited

U.S. PATENT DOCUMENTS

| | | |
|---|---|---|
| 6,233,566 B1 | 5/2001 | Levine et al. |
| 2005/0278249 A1 | 12/2005 | Jones et al. |

(Continued)

OTHER PUBLICATIONS

International Search Report in PCT International Application No. PCT/US2021/039231, dated Sep. 30, 2021.

*Primary Examiner* — Namrata Boveja
*Assistant Examiner* — Amit Patel
(74) *Attorney, Agent, or Firm* — Cognition IP, P.C.; Edward Steakley

(57) ABSTRACT

A weight is generated for one or more loan tier metrics for each of a plurality of loan tiers, each loan tier associated with a respective loan tier qualifying score. A plurality of transaction records in the depository account of the user are received, the received transaction records including a chronological listing of debits and credits. A plurality of loan tier metrics are determined based on the chronological listing of debits and credits. A respective metric value is generated for one or more of the loan tier metrics, each respective metric value based on the transaction records in the depository account of the user. A machine learning model determines that based on prior activity of the user recorded in the transaction records, a first loan tier metric of a first loan tier has greater importance in determining a loan servicing capability of the user than a second loan tier metric of the first loan tier, and adjusts a selected weight chosen from a first weight of the first loan tier metric and a second weight of the second loan tier metric, so that the first weight is greater than the second weight. A user score is computer based on applying the adjusted weight to the respective metric value associated with the transaction records that corresponds to the first loan tier metric of the first loan tier, wherein the user score represents a prediction of the user's future loan servicing capability. A determination is made that the user score meets or exceeds a loan qualifying score for the first loan tier.

20 Claims, 13 Drawing Sheets

(56) References Cited

U.S. PATENT DOCUMENTS

| | | |
|---|---|---|
| 2009/0299911 A1 | 12/2009 | Abrahams et al. |
| 2011/0270779 A1 | 11/2011 | Showalter |
| 2015/0026035 A1 | 1/2015 | Showalter |
| 2016/0371772 A1 | 12/2016 | Zuluaga et al. |
| 2019/0333140 A1 | 10/2019 | Sullivan et al. |
| 2020/0019901 A1 | 1/2020 | Garcia et al. |

| | WEIGHT | JANE'S METRICS | TIER 1 | TIER 2 | TIER 3 | TIER 4 | TIER 5 | TIER 6 |
|---|---|---|---|---|---|---|---|---|
| INCOME (MONTHLY) | 0.4 | 25,000 | >$20,000 | >$15,000 | >$10,000 | >$5000 | >$2000 | >$1,500 |
| INCOME STABILITY | 0.3 | BI-WEEKLY | BI-WEEKLY, WEEKLY | >MONTHLY | >MONTHLY | >IRREGULAR | >IRREGULAR | >IRREGULAR |
| ACCOUNT AGE | 0.2 | 534.19 DAYS | >400 DAYS | >300 DAYS | >200 DAYS | >100 DAYS | >50 DAYS | >=0 DAYS |
| EXPENSE RATIO | 0.1 | 0.97 | <.95 | <1.2 | <1.3 | <1.35 | <1.35 | >1.35 |
| METRIC 4 | 0.7 | 0.5 | - | - | - | - | - | - |
| METRIC 5 | 0.6 | 0.8 | - | - | - | - | - | - |
| METRIC 6 | 0.5 | 0.26 | - | - | - | - | - | - |
| METRIC 7 | 0.4 | 0.1 | - | - | - | - | - | - |
| METRIC 8 | 0.3 | 0 | - | - | - | - | - | - |
| METRIC 9 | 0.2 | 0.99 | - | - | - | - | - | - |
| METRIC 10 | 0.1 | 0.13 | - | - | - | - | - | - |
| SCORE | MAX = 4.3 | | 3 (70%) | 3.2 (74%) | 3.5 (81%) | 3.8 (88%) | 3.8 (88%) | 4.3 (100%) |

FIG. 3B

| | WEIGHT | JOHN'S METRICS | TIER 1 | TIER 2 | TIER 3 | TIER 4 | TIER 5 | TIER 6 |
|---|---|---|---|---|---|---|---|---|
| INCOME (MONTHLY) | 0.4 | 2,500 | >$20,000 | >$15,000 | >$10,000 | >$5000 | >$2000 | >$1,500 |
| INCOME STABILITY | 0.3 | IRREGULAR | BI-WEEKLY, WEEKLY | >MONTHLY | >MONTHLY | >IRREGULAR | >IRREGULAR | >IRREGULAR |
| ACCOUNT AGE | 0.2 | 40 DAYS | >400 DAYS | >300 DAYS | >200 DAYS | >100 DAYS | >50 DAYS | >=0 DAYS |
| EXPENSE RATIO | 0.1 | 1.5 | <.95 | <1.2 | <1.3 | <1.35 | <1.35 | >1.35 |
| METRIC 4 | 0.7 | 0.4 | - | - | - | - | - | - |
| METRIC 5 | 0.6 | 0.2 | - | - | - | - | - | - |
| METRIC 6 | 0.5 | 0.1 | - | - | - | - | - | - |
| METRIC 7 | 0.4 | 0 | - | - | - | - | - | - |
| METRIC 8 | 0.3 | 0 | - | - | - | - | - | - |
| METRIC 9 | 0.2 | 108 | - | - | - | - | - | - |
| METRIC 10 | 0.1 | 0.13 | - | - | - | - | - | - |
| SCORE | MAX = 4.3 | | .4 (9%) | .4 (9%) | .7 (16%) | 2.3 (53%) | 2.7 (63%) | 4.3 (100%) |

FIG. 3C

INTELLIGENT LOAN QUALIFICATION BASED ON FUTURE SERVICING CAPABILITY

CROSS-REFERENCE TO RELATED APPLICATIONS

This application claims the benefit of U.S. application Ser. No. 16/912,673, filed on Jun. 25, 2020, which is hereby incorporated by reference in its entirety.

FIELD OF THE INVENTION

The present invention relates generally to financial loans, including lines of credit, and more particularly, to systems and methods providing for intelligent loan qualification based on future servicing capability.

BACKGROUND

Financial loans are a major part of life and practical necessity for many around the world. Whether an individual is in need of financing for a college education, a first house, a credit card, a car, or some other significant expense, qualifying for a loan for that expense is of major significance. In countries such as the United States and Canada, credit scores are typically used for determining whether individuals are qualified for a particular loan or not. Within the US, FICO scores are the most widely used type of credit score. A credit score is a number representing an individual's creditworthiness. Credit scores, and their associated credit reports, are based on an analysis of a person's credit history. Lenders and creditors, such as banks and credit card companies, use a consumer's credit report (including FICO or Vantage score), their self-reported income, and employment status as the basis for an extension of loan or credit. These criteria are used to evaluate the potential risk posed by lending money to consumers, and to mitigate losses caused by, for example, a consumer being unable to service scheduled loan payments. Lenders use credit scores to determine who qualifies for which loan, at what interest rate and credit limit. Aside from typical lenders such as banks, other organizations used credit scores for such determinations as ell. including insurance companies, landlords and realtors, and more.

The current widespread use of credit scores has some major shortcomings. One such problem is that if the standard is for creditors to rely on a credit report as an extension of credit, then it's very difficult to establish credit history, because no creditor will want to be the first to give credit to someone with no credit history. This is a conundrum, as having a decent credit score is often a pre-requisite to accessing credit, but a decent credit score cannot be built unless the consumer has been granted credit in the past.

Another problem is that there is a great deal of relevant information which a credit score fails to capture. Credit scores include a history of prior credit behavior, but do not provide insights into current, real-time information about a user's credit or cashflow. Credit reports and credit histories are also stale, due to a lag in the amount of time it takes to report information and have it register within a credit report and credit score. In some cases, important information is simply not reported at all. Information is also often inaccurate. In determining information collected by multiple separate sources—e.g., the three central credit reporting agencies within the US—the information may be contradictory across the three sources.

Additionally, when traditional credit card issuers are performing "underwriting" of individuals, for example, discrimination is not uncommon, as there is a human factor involved in reviewing the individual's account and approving or rejecting based on the information inside. Such factors which may be ripe for discrimination can include, for example, a perceived "foreign"-sounding name of the person, or a particular neighborhood the person lives in. A number of documented cases exist wherein discrimination was found to have been applied to credit card applications.

Aside from documented evidence of clear discrimination, bias may occur in more subtle, even subliminal ways which may be difficult or impossible to perceive or quantify. This is also due to the human element of making judgments and decisions for each individual case. In this way, the issue runs even deeper that what we can readily identify, and the only way to avoid it is by underwriting based purely on objective data rather than human judgment.

Finally, many people are rejected for loans due to, e.g., poor credit scores as a result of struggling with medical bills, having a lack of credit history in a particular country due to being a recent immigrant to that country, and similar. In many such cases, even if they are ultimately approved for a line of credit, they may find that a high annual percentage rate ("APR") is attached, a credit limit is restrictively low, or other suboptimal outcome. This may be despite the presence of additional information, namely income and spending patterns, indicating that the individual presents minimal or almost no risk of inability to service the loan. From an issuer's standpoint, risk mitigation using credit scores and credit history is suboptimal, and thus issuers address risk mitigation by charging higher fees, e.g., in the form of higher interest rates.

Thus, there is a need in the field of credit underwriting to create a new and useful system and method for providing more accurate loan and credit qualification determinations using cashflow. The source of the problem, as discovered by the inventors, is a lack of loan and credit qualification determination in a way that hedges less risk by providing a more accurate prediction of an individual's future servicing capability.

BENEFITS

The invention overcomes the existing problems in a number of ways. First, the system provides a more accurate prediction of the consumer's future loan servicing capability, by using the user's account and recent transaction records to create a picture of cashflow rather than outdated, contradictory, and/or incomplete credit score and credit report information. In addition, analyzing actual income and cashflow is often far more accurate than analyzing self-reported income. Second, the system is automated in retrieving relevant information and making determinations on which loan tiers the consumer is qualified for, thus obviating the need for human intervention and overcoming the problems of human bias and discrimination, including bias which is difficult to perceive or quantify. Third, since the system is automated, determinations can be made in real time or substantially real time upon a consumer agreeing to the determination. This means that determinations can be completed in, e.g., seconds rather than days. Fourth, by relying on recent transaction records from a user's account rather than a past record of credit history, consumers can be assured that long-past financial mistakes or a lack of credit received in the past will not penalize them in procuring current credit.

Many other benefits will be apparent based on the description and figures.

SUMMARY

According to various embodiments, the invention uses a customer's bank account and/or recent depository or cash flow history, rather than credit report or credit score. First, the system requests and is provided access to a customer's account, such as a depository account. The system then retrieves transaction records from the account (for example, 6 months' worth of transaction records). From these transaction records, a set of metrics is generated or assigned, with weights attached to each metric representing the metric's importance relative to other metrics. Buckets, or "tiers", are defined for determining which qualifying loan offer is extended. For example, based on which tier a consumer is placed into, a credit limit can be determined based on how much credit the consumer is deemed to be able to afford. Qualifying for a tier is based on whether the consumer meets thresholds for various metrics. A score is determined for the consumer, and is derived from the weights and thresholds met for the metrics. The consumer is then placed in the highest qualifying tier that is within the range of the determined score.

One embodiment relates to a method for assigning a qualifying loan tier to a user based on future loan servicing capability. The system sends, to a client device, a request to access a depository account for a user of the client device. Upon receiving permission to access the depository account, the system receives transaction records in the depository account. The system generates or receives a number of metrics and assigns weights for each of the metrics, and also generates or receives a number of loan tiers with qualifying scores. Each loan tier includes the metrics and a unique threshold assigned to each metric for that loan tier. The system then determines a value for each of the metrics in the loan tiers based on the transaction records, and computes a user score for each of the tiers based on whether the values of each metric meet or exceed the unique threshold for that tier. Finally, the system assigns the user to a highest qualifying loan tier for which the user score meets or exceeds the qualifying score.

In some embodiments, the system further determines a qualifying offer for the user based on the assigned highest loan tier for that user. The qualifying offer can be, for example, a line of credit, a lump sum loan such as a house mortgage or car mortgage, an approval for one or more purchases or rentals (e.g., approval for renting a property), or any other suitable offer. In some embodiments, the qualifying offer is a securitized offer, such as a securitized credit card. In some embodiments, the system generates one or more reports based at least on the assigning of the user to the highest qualifying loan tier and the transaction records.

In some embodiments, the system receives one or more additional transaction records from the depository account, and then modifies one or more assigned weights and/or unique thresholds for one or more metrics based on the additional transaction records. In some embodiments, this can be done in real-time or substantially real time, periodically, semi-periodically, or upon some triggering event. In some embodiments, an artificial intelligence (AI) model can be used and configured to modify the assigned weights and/or thresholds. Such AI models may include, for example, machine learning and/or deep learning models, such as deep learning models which utilize neural networks. In some embodiments, the AI model can facilitate the system self-correcting or self-adjusting to improve determinations based on a reward feedback circuit.

In accordance with another embodiment, a method for assigning a qualifying loan tier to a user based on future loan servicing capability is provided. A weight is generated for one or more loan tier metrics for each of a plurality of loan tiers, each loan tier associated with a respective loan tier qualifying score. Generating the weight for a respective loan tier metric includes accessing one or more anonymized historical transaction records, training one or more machine learning models based at least on a portion of the anonymized historical transaction records, and determining the weight of the respective loan tier metric based on output from training of the one or more machine learning models. An access request to access a depository account of a user is sent, the depository account hosted on a banking platform external to a source of the access request, the one or more anonymized historical transaction records originating separately depository account of the user. Upon receiving permission to access the depository account, a plurality of transaction records in the depository account of the user are received, the received transaction records including a chronological listing of debits and credits. A plurality of loan tier metrics are determined based on the chronological listing of debits and credits, the plurality of loan tier metrics including at least one of income, income frequency, income stability, and overdraft history. A respective metric value is generated for one or more of the loan tier metrics, each respective metric value based on the transaction records in the depository account of the user. The one or more machine learning models determine that based on prior activity of the user recorded in the transaction records, a first loan tier metric of a first loan tier has greater importance in determining a loan servicing capability of the user than a second loan tier metric of the first loan tier. The one or more machine learning models adjust a selected weight chosen from a first weight of the first loan tier metric and a second weight of the second loan tier metric, thereby generating an adjusted weight, so that the first weight is greater than the second weight. A user score is computer based in part on applying the adjusted weight to the respective metric value associated with the transaction records that corresponds to the first loan tier metric of the first loan tier, wherein the user score represents a prediction of the user's future loan servicing capability. A determination is made that the user score meets or exceeds a loan qualifying score for the first loan tier.

In one embodiment, one or more patterns of activity are determined based on the plurality of transaction records, the one or more machine learning models determine the plurality of loan tier metrics based on the one or more patterns of activity.

In another embodiment, the one or more machine learning models determine that based on prior activity of the user recorded in the transaction records, the overdraft history has a greatest importance in determining a loan servicing capability of the user than one or more other loan tier metrics of the first loan tier, and adjust a first weight associated with the overdraft history so that the first weight is greater than one or more second weights associated with the one or more other loan tier metrics.

In another embodiment, the one or more loan tier metrics include monthly income, and determining monthly income includes dividing a total amount of income received in the account over N months by N, wherein N is a selected number.

In another embodiment, the one or more loan tier metrics include income frequency, and determining income frequency includes identifying a plurality of second transactions that represent income and determining an average number of days between the second transactions.

In another embodiment, the one or more loan tier metrics include income stability, and determining income stability includes determining a first amount of income during a recent month, determining an average monthly amount of income over N months, wherein N is a selected number, and determining whether the first amount represents a decline exceeding a predetermined percentage of the average monthly amount of income.

In another embodiment, the one or more loan tier metrics include overdraft history, and determining overdraft history includes sorting the transaction records in reverse order, applying the transaction records in reverse order to a balance of the depository account, determining a number of times the balance is negative, and determining an average number of overdrafts per month based on the number of times the balance is negative.

It is understood that, in some embodiments, respective weight values correspond with loan metric input features of a machine learning model(s). In some embodiments, the machine learning model output may correspond to a current weight value of an overdraft history loan metric input feature satisfying a threshold condition of being greater than all other current weight values of other types of loan metric input features. For example, based on presence of the threshold condition, the machine learning model output comprises a prediction of a loan servicing capability based on the current weight value of the overdraft history loan metric input.

Various embodiments include a module(s) and/or one or more functionalities to redact privacy information/data, to encrypt information/data and to anonymize data to ensure the confidentiality and security of user and platform information/data as well as compliance with data privacy law(s) and financial regulations of various jurisdictions.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 3B is a diagram illustrating one example embodiment 320 of a determination of a qualifying tier for an individual, in accordance with some embodiments.

FIG. 3C is a diagram illustrating one example embodiment 340 of a determination of a qualifying tier for another individual, in accordance with some embodiments.

DETAILED DESCRIPTION

Figure 1A:
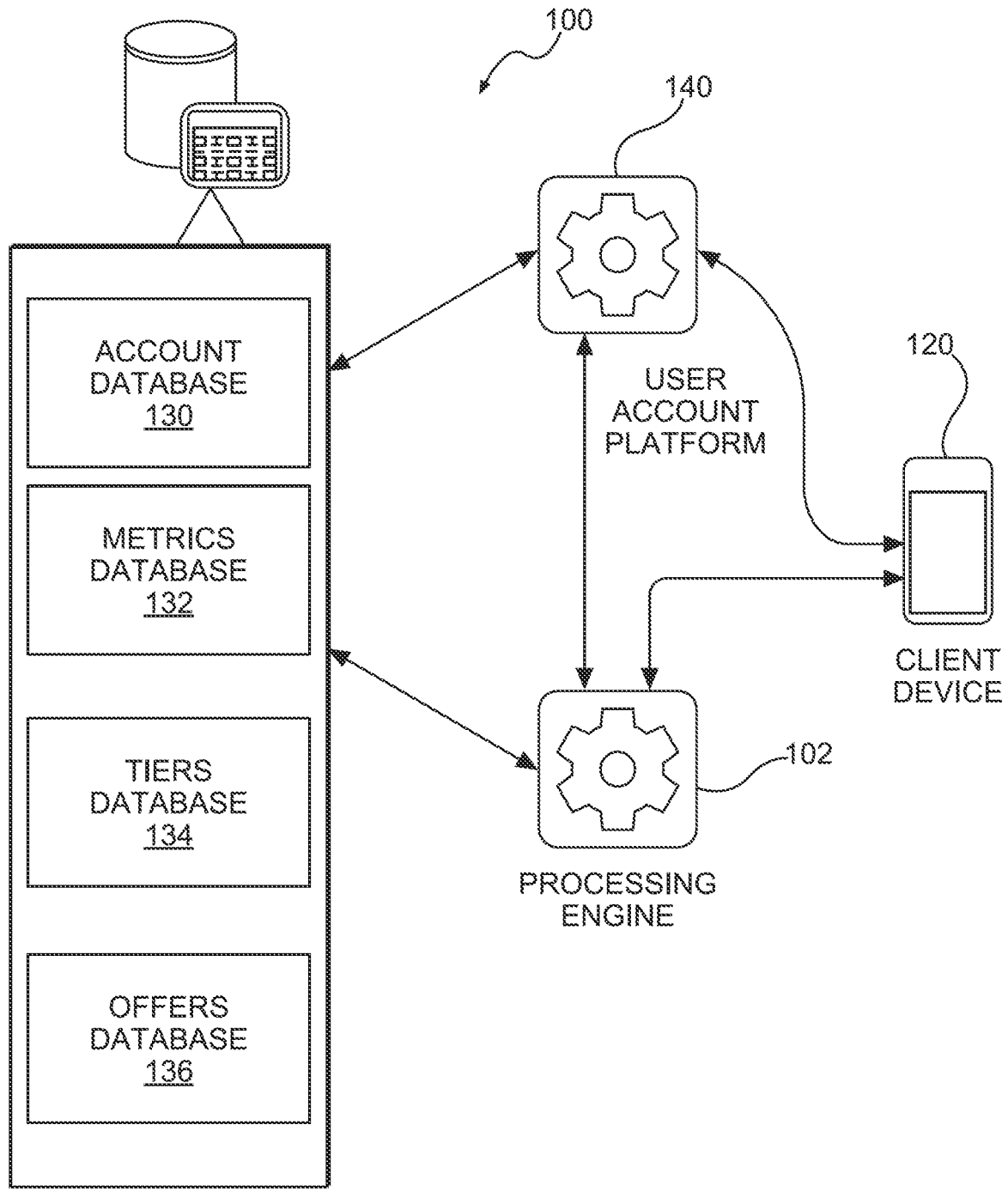
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a client device 120 is connected to a processing engine 102 and a user account platform 140. The processing engine 102 is connected to the user account platform 140, and optionally connected to one or more repositories and/or databases, including, e.g., an account database 130, metrics database 132, tiers database 134, and/or an offers database 136. One or more of the databases may be combined or split into multiple databases. The client device 120 in this environment may be a computer, and the user account platform 140 and processing engine 102 may be applications or software hosted on a computer or multiple computers which are communicatively coupled via remote server or locally.

The exemplary environment 100 is illustrated with only one client device, one processing engine, and one user account platform, though in practice there may be more or fewer client devices, processing engines, and/or user account platforms. In some embodiments, the client device, processing engine, and/or user account platform may be part of the same computer or device.

In an embodiment, the processing engine 102 may perform the method 200 (FIG. 2A) or other method herein and, as a result, assign a user to a qualifying loan tier In some embodiments, the processing engine 102 may further determine and/or send a qualifying offer to the user via the client device. In some embodiments, the processing engine 102 may generate and/or send a report relating to the qualifying loan tier that was assigned to the user. In some embodiments, the processing engine 102 is in communication with one or more of the client device, processing engine, user account, and/or other applications or devices over a network. In some embodiments, an application server and/or some other network server may facilitate this communication. In some embodiments, the processing engine 102 is an application, browser extension, or other piece of software hosted on a computer or similar device, or is itself a computer or similar device configured to host an application, browser extension, or other piece of software to perform some of the methods and embodiments herein.

Client device 120 is a device with a display configured to present information to a user of the device and send or receive data on behalf of the user of the device. In some embodiments, the client device 120 presents information in the form of a user interface (UI) with UI elements or components. In some embodiments, the client device 120 sends and receives signals and/or information to the processing engine 102 and/or user account platform 140. In some embodiments, client device 120 is a computing device capable of hosting and executing one or more applications or other programs capable of sending and/or receiving information. In some embodiments, the client device 120 may be a computer desktop or laptop, mobile phone, virtual assistant, virtual reality or augmented reality device, wearable, or any other suitable device capable of sending and receiving information. In some embodiments, the processing engine 102 and/or user account platform 140 may be hosted in whole or in part as an application or web service executed on the client device 120. In some embodiments, one or more of the user account platform 140, processing engine 102, and/or client device 120 may be the same device.

The user account platform 140 is a platform which hosts and/or maintains a financial account connected with a user In some embodiments, the user is the user of the client device 120, whose information is being evaluated for a loan tier determination. In some embodiments, the user account platform 140 may be a website, application, browser extension, server, database, application programming interface (API), or some other form of hosting and/or maintaining a financial account. In some embodiments, a bank, lending agency, credit union, or other organization owns and/or maintains the user account platform 140. The information in the user account platform 140 is typically secure and confidential. The user may provide permissions to the processing engine 120 or other part of the system to access and view some or all of the information within the user's account.

In some embodiments, optional repositories can include one or more of an account database 130, metrics database 132, tiers database 134, and/or offers database 136. The optional account database 130 functions to store and/or maintain account data associated with the user account platform 140, including data related to transaction records. The optional metrics database 132 functions to store and/or maintain metrics. The optional tiers database 134 functions to store and/or maintain information related to loan tiers. The optional offers database 136 functions to store and/or maintain qualifying offers. The optional database(s) may also store and/or maintain any other suitable information for the processing engine 102 or user account platform 140 to perform elements of the methods and systems herein. In some embodiments, the optional database(s) can be queried by one or more components of system 100 (e.g., by the processing engine 102), and specific stored data in the database(s) can be retrieved.

Figure 1B:
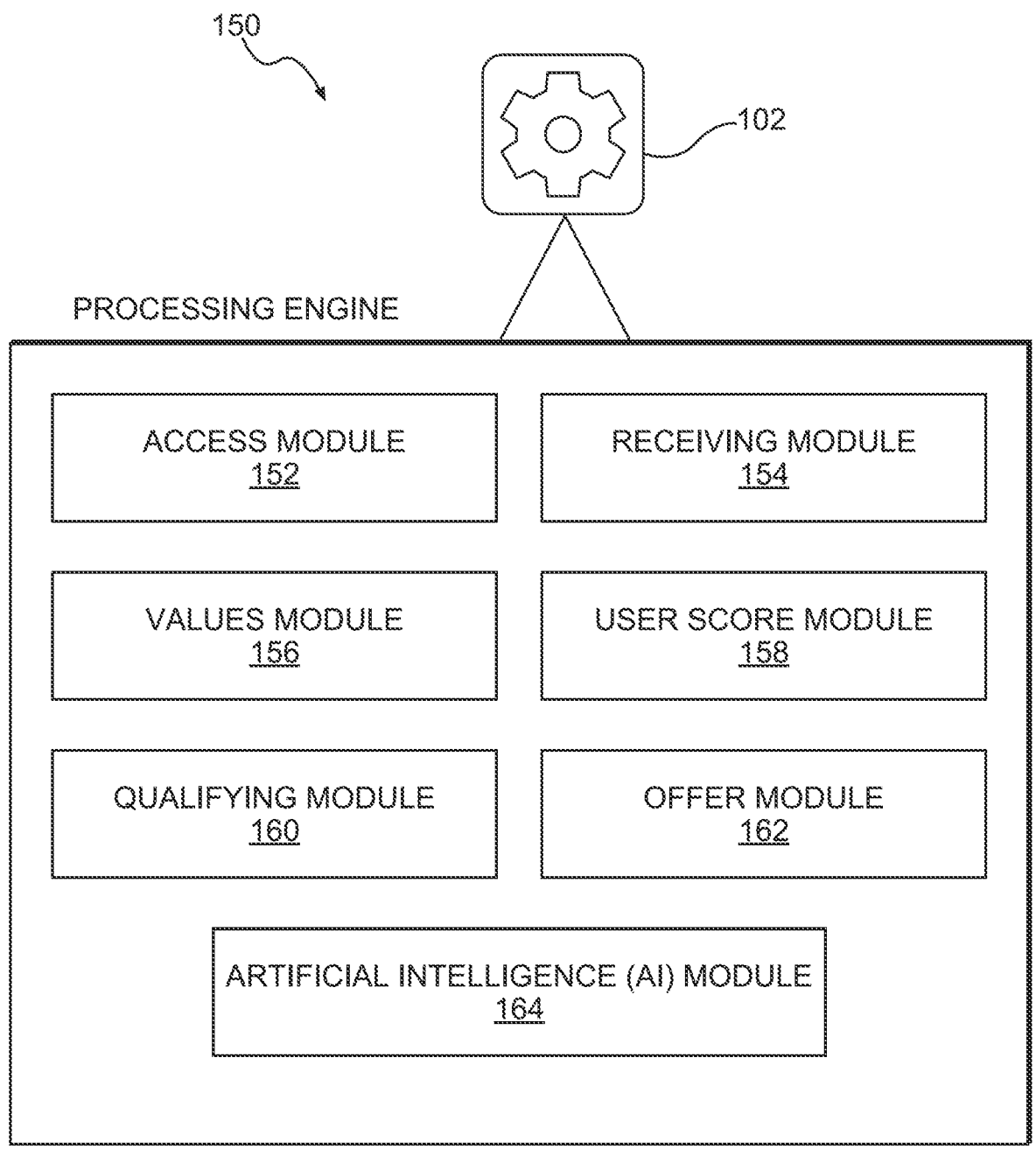
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Access module 152 functions to facilitate access and permissions to a user's account (i.e., financial account) for the processing engine. This access is coordinated with a user account platform 140 which hosts and/or maintains the user's account.

Receiving module 154 functions to receive data such as information, records, and/or files from one or more sources, such as the user account platform 140, optional repositories, or client device 120, and then functions to send the data to the processing engine 102. In some embodiments, this data can include metadata and/or files related to a user account, transaction records, metrics, tiers, thresholds, or any other suitable data.

Values module 156 functions to determine a value for derived or received metrics based on a set of received transaction records from a user's account.

User score module 158 functions to compute a user score for each of a number of tiers based on whether the values of each metric meet or exceed a unique threshold for that tier.

Qualifying module 160 functions to assign the user to a highest qualifying loan tier for which the user score meets or exceeds a qualifying score.

Optional offer module 162 functions to determine a qualifying offer for the user based on the assigned highest loan tier for that user.

Optional artificial intelligence (AI) module 164 functions to train one or more AI (e.g., machine learning or other suitable AI) models to perform one or more steps of the invention.

The above modules and their functions will be described in further detail in relation to the exemplary methods below.

II. Exemplary Method

Figure 2A:
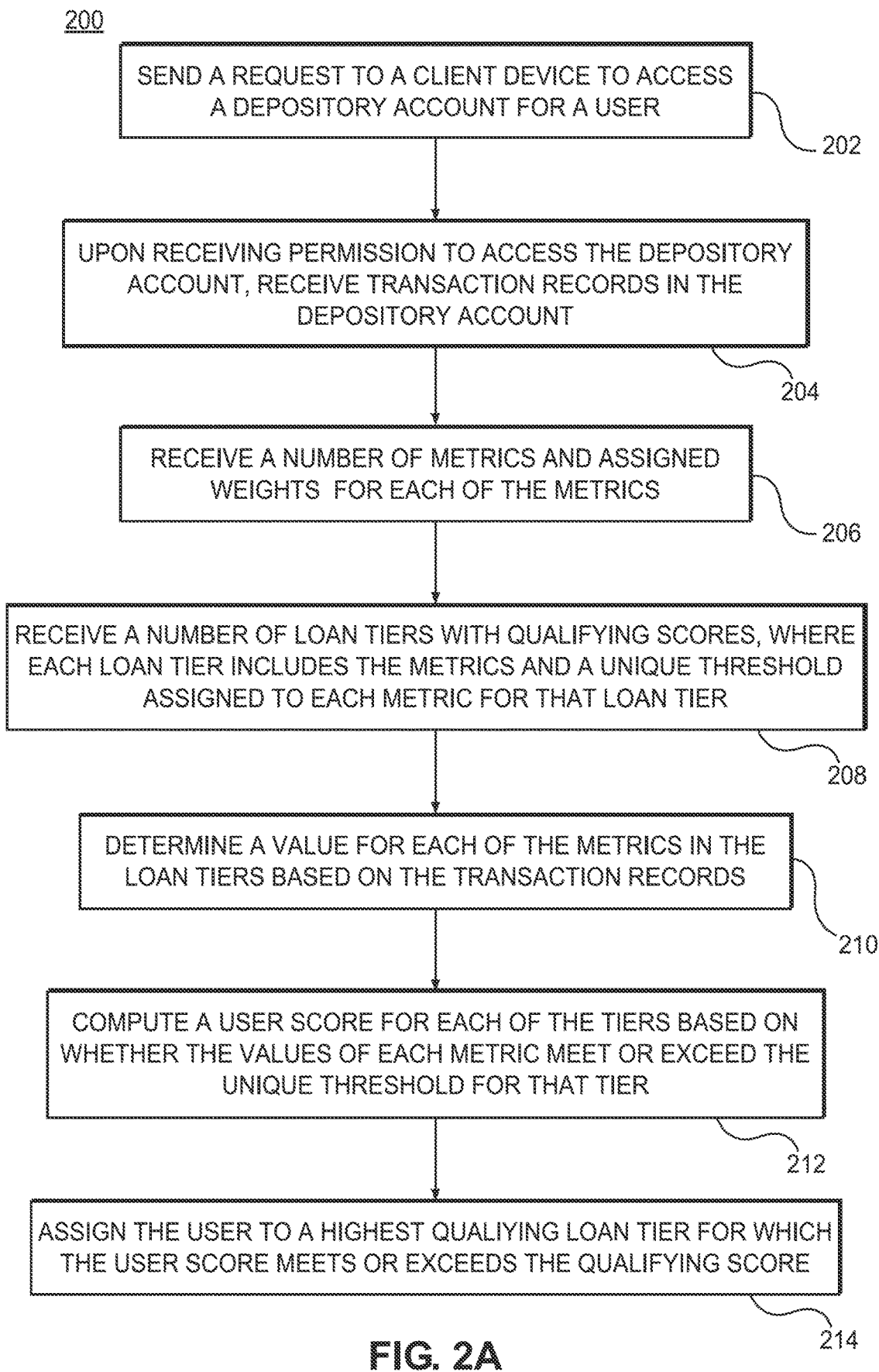
FIG. 2A is a flow chart illustrating an exemplary method that may be performed in some embodiments.

FIG. 2A is a flow chart illustrating an exemplary method that may be performed in some embodiments.

At step 202, the system sends a request to a client device to access a depository account for a user. In some embodiments, the request takes the form of a message, notification, or prompt to the client device requesting the user of the client device to grant access or permission to view some or all of a particular user financial account on user account platform. In some embodiments, the user must provide one or more pieces of data about the bank account in order for permission to be granted. In some embodiments, one or more components of the system must be authenticated by the user account platform. For example, an application asking for access to a user's bank account must be verified as a trusted and authenticated actor requesting permission.

At step 204, upon receiving permission to access the depository account, the system receives transaction records in the depository account. In some embodiments, permission is received by the user account platform authenticating the system. In some embodiments, the user account platform transfers files to the system, which are received by the processing engine. Any form of receiving permission can be contemplated. In some embodiments, transaction records are stored in an account database, and are retrieved from the account database by the user account platform and/or system once permission is granted.

In some embodiments, the transaction records comprise at least cashflow data of the user within the depository account. This includes, for example, money deposited into the account, such as through regular, semi-regular, or one-time direct deposits from an employer, as well as money withdrawn from the account or deducted as a result of transactions the user entered into. In some embodiments, the transaction records include transactions which are on hold or in the middle of being processed by the user account platform (e.g., the bank which maintains the user account), while in other embodiments, such transactions are excluded. In various embodiments, the transaction records can also include information relating to, e.g., overdrafts, ratio of expenses to income, monthly recurring liabilities, on-time payments of loans, mortgages, and/or credit cards, or any other suitable or relevant data which may be used by the system in making determinations with respect to an individual. In some embodiments, customization of which transaction records are authorized for viewing, processing, or accessing may be provided by one or more of the user account platform, the user, or the processing engine.

In some embodiments, the system receives only a recent set of transaction records from the depository account. For example, once provided access to the user's account, the system may retrieve six months' worth of transaction history. This can be useful when a determination is to be made based on material which is deliberately (i.e., by design) limited only to relatively recent transactions, and where an individual's entire credit history is not to be used.

At step 206, the system generates or receives a number of metrics and assigned weights for each of the metrics. In some embodiments, the system generates the metrics by deriving them according to one or more processes or techniques. Such processes may include any of a number of mathematical formulas or calculations, or algorithms for deriving metrics based on a set of data. In other embodiments, rather than the system generating the metrics, the system receives the metrics from, e.g., a metrics database 132 or some other database or repository which stores and/or maintains metrics. Metrics are individual criteria which are used in making a determination about an individual's future loan servicing capability. In various embodiments, metrics can include one or more of, e.g.: account age (e.g., greater than 400 days), overdraft history, monthly income, income stability (e.g., monthly, bi-weekly, weekly, irregular), income frequency, expense ratio, savings, cost of living index, or any other criteria which can be relevant to determine an individual's future loan servicing capability.

In some embodiments, the metrics are derived by the system sorting the transaction records into a sorted list, In some embodiments, the transaction records may be sorted based on transaction date and transaction type (e.g., debit or credit), although any other suitable way of sorting the transaction records may be possible. In some embodiments, once the transaction records are sorted, the system determines the oldest transaction to establish the account age (i.e., the number of days from the date of first transaction in the sorted list until the current date). The list is then collated by relative amounts to establish a pattern of consistency of income and determine income stability. In some specific embodiments, for example, the system calculates the average amount of days in between account credits of at least $100. In some embodiments, the transactions can also additionally or alternatively be grouped by month, and then the system determines the average monthly income flowing into the account for the number of months available. For example, this determination may involve calculating the total income accrued over X months divided by X months.

The system also generates or receives assigned weights for each of these metrics. The weights represent their associated metric's relative importance, wherein the importance is relative to the rest of the metrics used in making the determination. In some embodiments, weights are set based on the relative importance of one metric to another. In some embodiments, these weights may be derived from historical data, including, e.g., aggregated and/or anonymized historical data. In some embodiments, the weights are then subsequently adjusted as actual customer data regarding on-time payments and delinquency are analyzed and fed back into a model. For example, actual customer data may show, over a given period of time, that income stability is more important than the relative amount of income itself In such a case, the system can adjust the weight such that income stability has a greater influence in the score calculation than the relative amount of income has.

At step 208, the system generates or receives a number of loan tiers with qualifying scores, where each loan tier includes the metrics and a unique threshold assigned to each metric for that loan tier. A loan tier (or simply "tier") represents a classification or "bucket" which an individual can potentially be qualified or disqualified for, based on whether that individual meets the unique criteria for qualification with respect to that tier. In some embodiments, each tier has a different qualifying loan or loan offer attached to it, and an individual who is determined to qualify for that tier also qualifies for the loan or loan offer. In some embodiments, such as those in which the loan is a line of credit, each tier is designated with one or more of: an amount of credit or loan (i.e., a credit limit), a level of securitization, and/or an interest rate, e.g., a specific annual percentage rate ("APR"). Some tiers may, for example, have no credit limit and/or no level of securitization.

In some embodiments, the system generates loan tiers based on, e.g., determining what the customer may be able to reasonably afford to pay per month to service the credit provided. If, for example, the analysis of the customer's account indicates they should be able to comfortably pay $50 a month to service their debt, then the system can determine that the customer should be able to handle a line of $X. If the customer can only afford $20 a month, then the customer may receive a line of $Y. In some embodiments, the system derives a qualifying score for each tier based on historical data, including, e.g., aggregated and/or anonymized historical data, and sets the qualifying score for that tier relative to the other tiers.

In some embodiments, a level of securitization can be associated with a tier. Securitization represents an extent to which a loan or line of credit requires collateralization to maintain. A secured line of credit may be offered based on tier, with the secured line of credit requiring its holder to provide a cash security deposit. In some cases, the secured line of credit can require a cash security deposit which is equal to the determined credit line. For example, a secured line of credit offer based on a given tier may be determined to have a $500 credit line with a $500 deposit, or a $500 credit line a $250 deposit.

In some embodiments, a tier may be a blanket "disqualifying" tier, in which the individual is determined to not qualify for any available loans. In other embodiments, there may be no designated disqualifying tier as such. In such embodiments, no individual is disqualified or rejected from any option. Rather, if an individual is determined to be at high risk of not being able to service the loan, they may end up, e.g., in a tier which offers an extension of credit to that individual, but with securitization attached as described above. For example, a "high risk" individual may only qualify for a line of credit wherein they must send a cash deposit that is a dollar-for-dollar equivalent to what they receive in credit. Such securitized lines of credit often can be useful to individuals who have not yet built up a credit history and would like to start, or individuals who are interested in rebuilding their credit in a more favorable way. in some embodiments, these individuals may be welcomed or encouraged to apply for or submit to a determination again after a set period of time (i.e., 6 months or 1 year). In some embodiments, an automatic determination may be made after a set period of time.

The "unique threshold" assigned to each metric for a loan tier indicates a value which must be met or exceeded with respect to the associated metric in order for an individual to be considered to have met that metric for purposes of determination for that tier. For example, an "income" metric may be used across multiple tiers. For Tier 1, the income threshold may be "greater than $20,000 monthly", while for Tier 6 the income threshold may be "greater than $1,500 monthly". Examples of individuals qualifying or disqualifying based on metrics and thresholds will be illustrated in further detail with respect to FIGS. 3A, 3B, and 3C below.

Each tier includes a qualifying score, by which an individual is determined to qualify or disqualify for that particular tier. In some embodiments, the scores relate to the weights for each of the metrics as well as the thresholds for those metrics. Generally, for tiers with higher thresholds assigned to metrics, the qualifying score that must be met is higher than for other tiers with lower thresholds assigned to those same metrics.

In some embodiments, a matrix is generated which includes the tiers, each of the metrics for each tier, and a threshold for each metric within each tier. Further illustration of such a matrix will be described with respect to FIGS. 3A, 3B, and 3C below.

At step 210, the system determines a value for each of the metrics in the loan tiers based on the transaction records. In some embodiments, the values relate to the metrics and the assigned weights for those metrics, as well as whether the user met or exceeded the threshold for the metrics within that particular tier. For example, if a user met or exceeded a threshold for three metrics but not two other metrics, then the weights for those three metrics are added up, but the weights for the other metrics are not added up.

At step 212, the system computes a user score for each of the tiers based on whether the values of each metric meet or exceed the unique threshold for that tier. The user score represents a prediction of the user's future loan servicing capability with respect to that particular loan tier. In some embodiments, the user score may be computed within a range, such as, e.g., a range between 0 and 100 . In some embodiments, the system determines a weighted average of the values of the metrics for that tier. For each unique threshold which is met or exceeded by the values of the corresponding metric, the assigned weight for that metric is added to the computation of the weighted average.

At step 214, the system assigns the user to a highest qualifying loan tier for which the user score meets or exceeds the qualifying score. In some embodiments, the user is determined to qualify for the highest tier for which their user score meets or exceeds the qualifying score of that tier.

In some embodiments, the system additionally determines a qualifying offer (e.g., a qualifying loan offer) based on the assigned highest loan tier for that user. in various embodiments, the qualifying offer may be, a particular line of credit, a lump sum loan, an approval for one or more purchases or rentals (such as approval to rent a particular apartment from a realtor), or any other suitable qualifying offer. In some embodiments, the qualifying offer is a securitized offer, as described above.

In some embodiments, the system schedules an auto-payment timing for one or more qualifying loans based on the transaction records, including the cashflow data of the user within the depository account. For example, the system may process the cashflow data to derive or receive information about when the individual gets paid on a regular or semi-regular basis, and then sets an auto-repayment schedule in a timely manner (e.g., monthly on a specific day each month) based on the expected money coming into the individual's account on that day. In some embodiments, the option to auto-pay is provided by the system via a prompt to the user, and a user roust agree to grant authority to the system auto-deduct the amount in question, e.g., up to and including the balance amount in the account. In some embodiments, the system provides one or more incentives to opt into auto-payment. In some embodiments, once auto-payment is turned on for a loan and is initiated, the individual receives a notification (e.g., by email or a notification within the application) whenever an auto-payment is deducted. In some embodiments, the option to cancel the transfer can be selected by the user upon receiving the notification, in which case the auto-payment is canceled before completion of processing.

In some embodiments, the system generates one or more reports based at least on the assigning of the user to the highest qualifying loan tier and the transaction records. The reports may include, for example, similar information as to what a credit report may include. In some embodiments, the system may send the report(s) out to one or more third-party individuals, entities, or organizations who are evaluating an individual for a loan determination. in some embodiments, the system may send the report(s) to one or more credit reporting agencies credit bureaus). In some embodiments, the individual must consent to and authorize the report being sent to the particular third-party individuals, entities or organizations. In some embodiments, graphics may be automatically generated for the report, such as charts, graphs, tables, visual analysis of information, and more. A wide variety of content and presentation may be contemplated for the generated report.

In some embodiments, rather than a determination being made for only one depository account, multiple user accounts, e.g., multiple depository accounts may be used in making the determination. In such embodiments, the system sends requests to the client device to access one or more secondary accounts for the user of the client device. Upon receiving permission from the secondary accounts, the system receives a number of secondary transaction records from the secondary accounts. The system can then determine a value for each of the metrics in the loan tiers based on the secondary transaction records in addition to the primary, initial transaction records from the initial user account. User scores can also be computed based on the secondary transaction records as well.

In some embodiments, once a determination is made, the system can receive one or more additional transaction records from the depository account, and modify one or more assigned weights and/or unique thresholds for one or more metrics based on the additional transaction records. in some embodiments, the modification of assigned weights and/or unique thresholds for the one or more metrics are made relative to the weights and/or unique thresholds for the other one or more metrics. In this way, the relative weight and importance given to particular metrics is adjusted relative to other metrics.

In one example, an overdraft history can have a weight of 0.3. If the system processes that an individual has an overdraft history of more than 50%, yet still made their payments every month for the past 6 months, then the system may determine that overdraft history is not as important for the determination as the weight reflects. Thus, the system can readjust the weight for overdraft history, and recursively apply the methodology across the whole calculation so that the weights for all of the other metrics are adjusted relative to one another in light of the readjusted weight for overdraft history.

In some embodiments, this can be performed in real time or substantially real time upon receiving the one or more additional transaction records. In other words, reassessments based on additional data in the user's account may be possible, and often very quickly, e.g., on the order of seconds. In some embodiments, such reassessments can be made at a periodic or semi-periodic time. For example, a reassessment of an individual can be scheduled to be made once an hour, or once a day, with additional records from the user account being checked for availability, retrieved, and processed by the system.

In some embodiments, the modification of one or more assigned weights and/or unique thresholds is performed by an artificial intelligence (AI) model. In various embodiments, the AI model may be, e.g., a machine learning model, deep learning model, or other suitable AI model. In some embodiments, a neural network may be utilized. In some embodiments, the AI models are trained on dataset(s) representing user account histories and/or previous readjustments, determinations, qualifying offers, weights, metrics, thresholds, qualifying scores, or any other suitable or relevant training data. In some embodiments, the AI models are trained on the specific user's account(s) and/or credit history.

In some embodiments, the AI model is configured to self-correct and improve based on a reward feedback circuit for modifying the one or more assigned weights and/or unique thresholds. For example, upon a readjustment of the weights of metrics, the readjustment values can be measured as leading to a desired outcome or undesired outcome according to one or more criteria, then fed back into the AI model as training data. As the AI model further trains upon the readjustments it makes and whether those readjustments are desirable or undesirable, the AI model self-corrects and improves as it continues to make readjustments. A wide variety of potential AI models can be employed for such a self-correcting technique.

In some embodiments, one or more AI models can be used in a similar manner for other determinations, computations, and/or predictions within the system. In some embodiments, one or more AI models are configured to automatically generate one or more of: metrics, weights, thresholds, tiers, qualifying scores for tiers, qualifying offers, reports, or any other suitable aspect of the system. In some embodiments, such AI models can similarly self-correct and improve this generation based on feedback reward circuits, as described above.

Figure 2B:
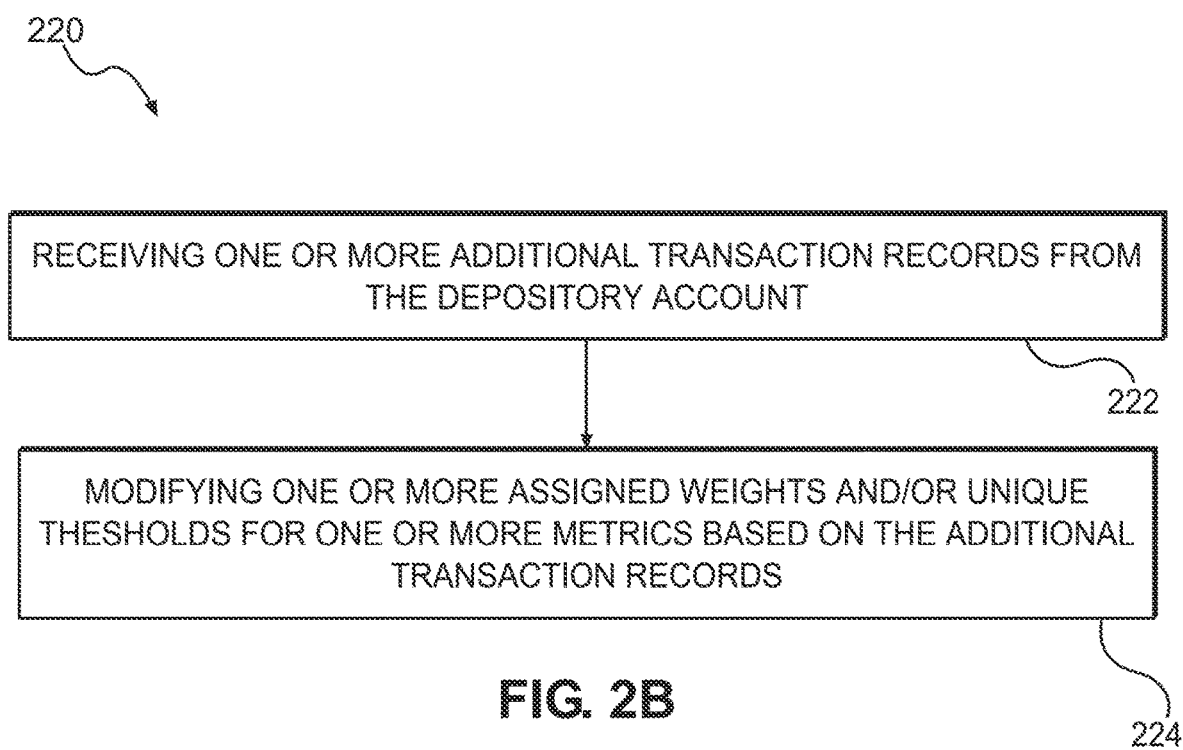
FIG. 2B is a flow chart illustrating additional steps that may be performed in accordance with some embodiments.

FIG. 2B is a flow chart illustrating additional optional steps that may be performed in accordance with some embodiments.

At optional step 222, the system can receive one or more additional transaction records from the depository account, as described above with respect to readjustment of weights and/or thresholds for metrics.

At optional step 224, the system can modify one or more assigned weights and/or unique thresholds for one or more metrics based on the additional transaction records, as described above with respect to readjustment of weights and/or thresholds for metrics.

Figure 3A:
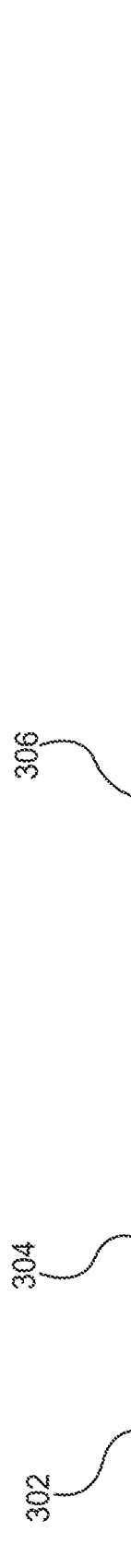
FIG. 3A is a diagram illustrating one example embodiment 300 of a set of tiers for making loan determinations, in accordance with some embodiments.

FIGS. 3A, 3B, and 3C together illustrate example workflows for how determinations are made for placing individuals within qualifying tiers.

FIG. 3A is a diagram illustrating one example embodiment 300 of a set of tiers for making loan determinations, in accordance with some embodiments. In some embodiments, a matrix is generated in a same or similar layout as the diagram illustrates. A set of metrics 302 are listed in the left column, including income (monthly), income stability, account age, expense ratio, and other metrics 4 through 10. These metrics are listed independent of tiers, as they are to be considered across all tiers. A weight 304 is listed for each of the metrics as well, indicating a number between 0 and 1 which represents the importance to be assigned to each of the metrics in making a determination. In some embodiments these are received, while in others they are generated or readjusted as described above. A set of tiers 306 are listed in the remaining columns. Six tiers each list different thresholds for the metrics, as described above with respect to the unique thresholds in FIG. 2A. Tier 1, for example, has a threshold with a much higher monthly income (greater than $20,000/month) than Tier 6 does (greater than $1,500 a month). An individual may not necessarily have to meet such an income to qualify for a tier, depending on the weight assigned to the income metric. If thresholds for other metrics are met or exceeded, then the weighted average of all of the metrics may add up to the individual qualifying for a tier based on the qualifying score for that tier.

FIG. 3B is a diagram illustrating one example embodiment 320 of a determination of a qualifying tier for an individual, in accordance with some embodiments. The metrics, weights, tiers, and thresholds from FIG. 3A. remain. Additionally added is a set of qualifying scores 322 for each tier, along with the individual's user score for the metrics, given the set of weights. Thus, for Tier 1 the individual has a user score of 3 or 70%, meaning 70% of the weighted average has been satisfied by that individual in order to qualify for that tier. For Tier 6, meanwhile, the individual has a user score of 4.36 or 100%, meaning the individual satisfied 100% of the weighted average for Tier 6. In this example, a qualifying score for each of the loan tiers is 70%. This means that an individual is assigned to the highest tier in which their user score meets or exceeds the 70% qualifying score. As noted throughout, the distinction between a user score and a qualifying score is that a user score is a computed score (e.g., percent or number) for the user, while a qualifying score is a score (e.g., percent or number) which is required to qualify for that tier.

Jane, the individual being evaluated for this determination, has consented and approved the system to access her user account from the user account platform, e.g. her bank. The system then retrieves transaction records from the user account, and determines Jane's metrics 324, i.e., values for each of the metrics based on the transaction records. For example, Jane's income may be determined to be $25,000 per month, her income stability is bi-weekly (e.g., she may receive a direct deposit twice per month), her account age may be calculated to be 534.19 days, and her expense ratio (i.e., her ratio of expenses to income) may be 0.97. Several other values for additional metrics are also determined based on Jane's transaction records. In this example illustration, the less shaded cells of the table are met, while the more shaded cells of the table are not, based on the transaction records.

The system then computes user scores for each of the tiers 1-6 depending on whether Jane's metrics meet or exceed, or fail to meet or exceed, the thresholds for those metrics in each tier. Jane's income qualifies for meeting or exceeding the thresholds for all of the tiers, and her bi-weekly deposits also qualify for all of the tiers. Her account age similarly qualifies across all tiers. Her expense ratio, meanwhile, qualifies for all of the tiers except the highest tier, Tier 1, which has a threshold of greater than 0.95. The qualifying score for Tier 1 is 3 or 70%. Since Jane has satisfied certain metrics and given the relative weight of those metrics, her user score of 3 meets or exceeds the qualifying score of 3 or 70%, and thus she qualifies for the highest Tier 1. In this example, Jane will be determining to qualify for the highest tier available that she qualifies for, so she is determined to qualify for Tier 1, and qualifying offers assigned to Tier 1 are presented to her.

FIG. 3C is a diagram illustrating one example embodiment 340 of a determination of a qualifying tier for another individual, in accordance with some embodiments. In this example, John's metrics 342 are calculated, rather than Jane's, in a similar manner. John's metrics show that his income is determined to be $2,500 per month, his income stability is irregular, his account age is 40 days, and his expense ratio is 1.5. Thus, he is determined to have a lower qualifying income, income stability, and account age than Jane did in FIG. 3B. His expense ratio is also higher than Jane's, indicating he may potentially not be as risk-averse or conscious in spending his available income. Based on the thresholds for the various tiers, John's income does not satisfy the threshold for Tiers 1, 2, or 3, but it does satisfy Tiers 4, 5, and 6. The same tiers are satisfied and not satisfied with respect to John's income stability. Given the relatively young account age of 40 days, he also disqualifies for the thresholds for account age for Tiers 1 through 5. Finally, his expense ratio does not satisfy thresholds for Tiers 1 through 5. Based on the qualifying scores for the tiers, John's computed user score does not qualify for Tiers 1 through 5. He does qualify for Tier 6, however. Therefore, he is designated as qualifying for Tier 6, and is presented with loan offers assigned to Tier 6.

Figure 4:
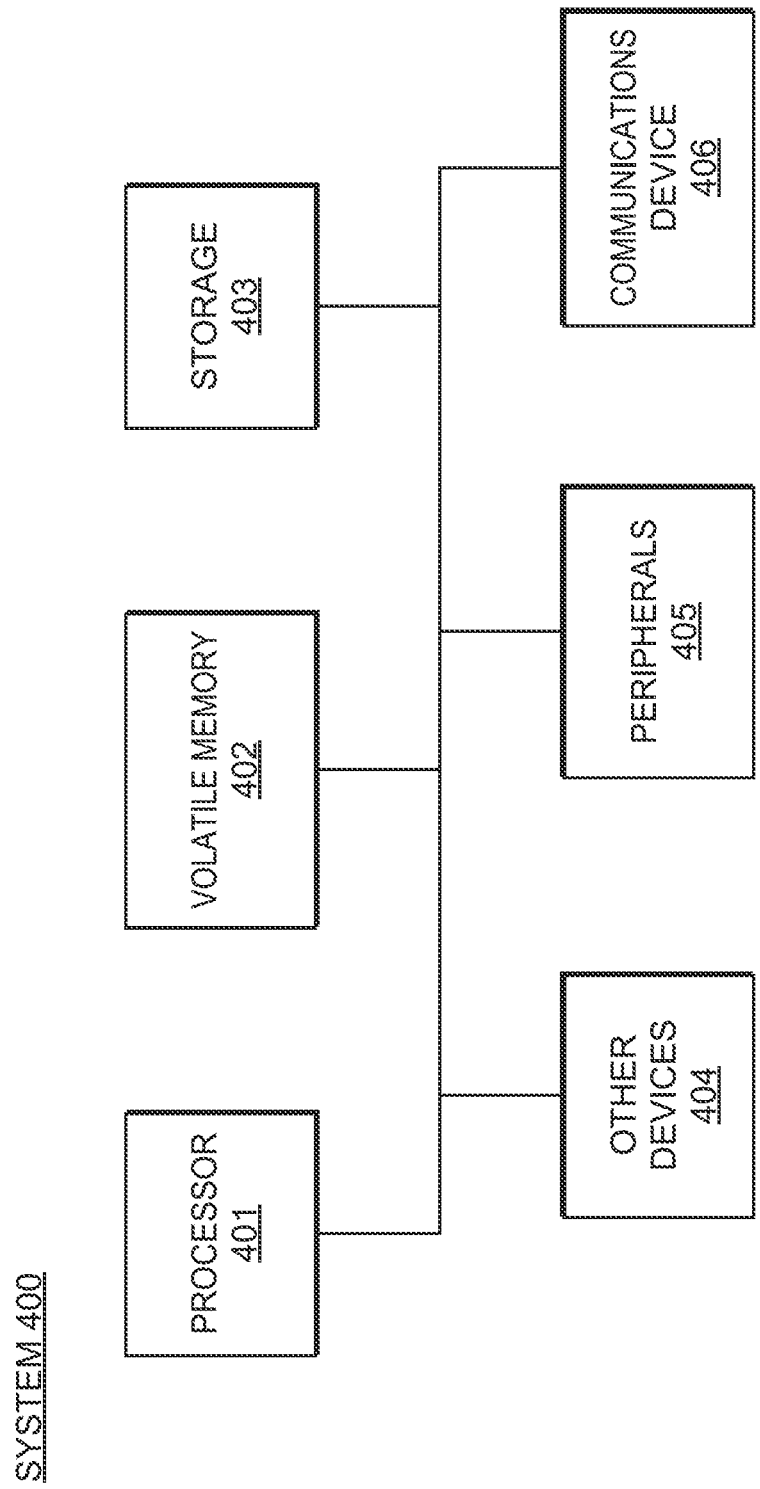
FIG. 4 is a diagram illustrating an exemplary computer that may perform processing in some embodiments.
Figure 5A:
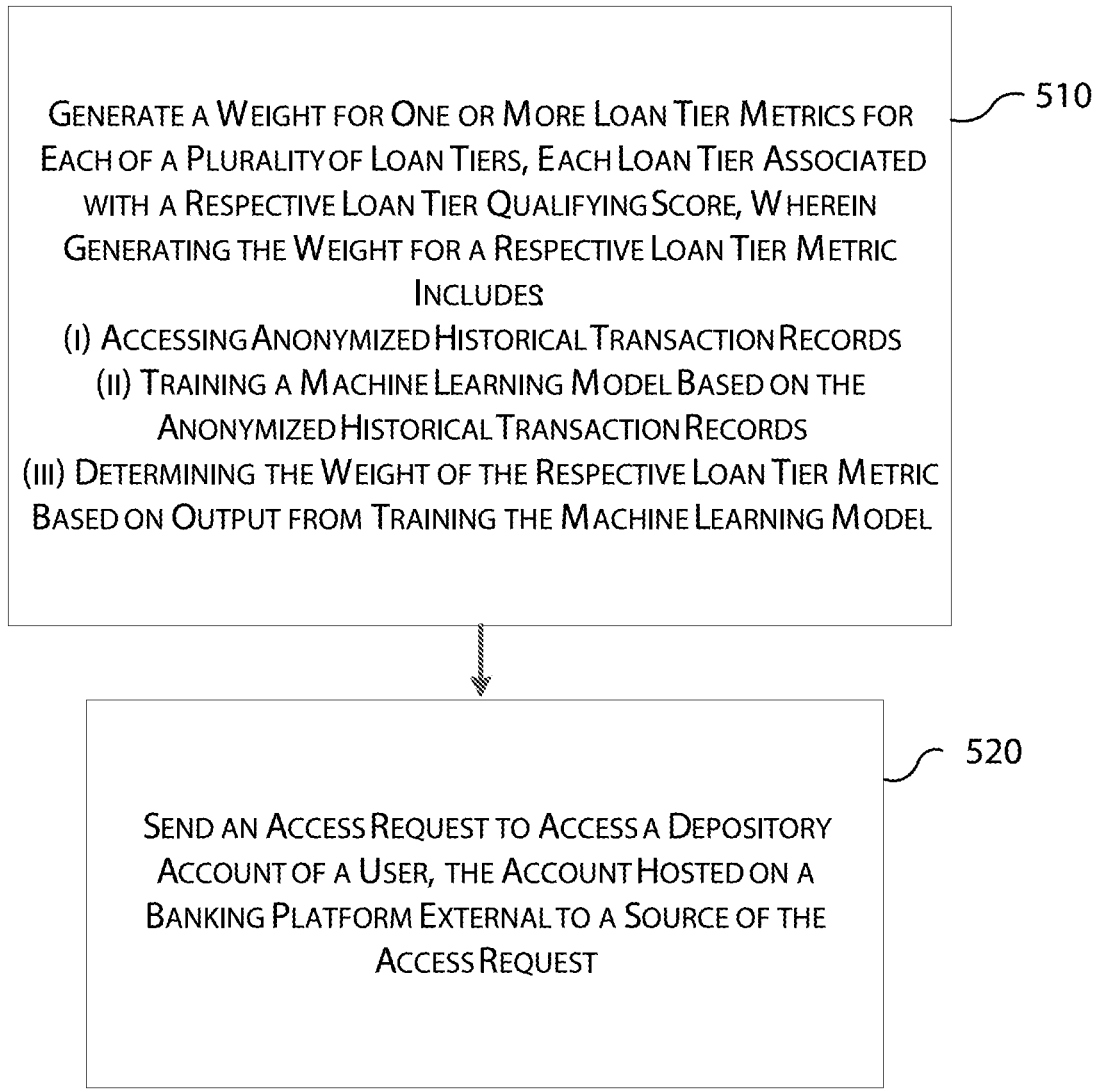
FIGS. 5A-5D include a flowchart of a method in accordance with an embodiment.
Figure 5B:
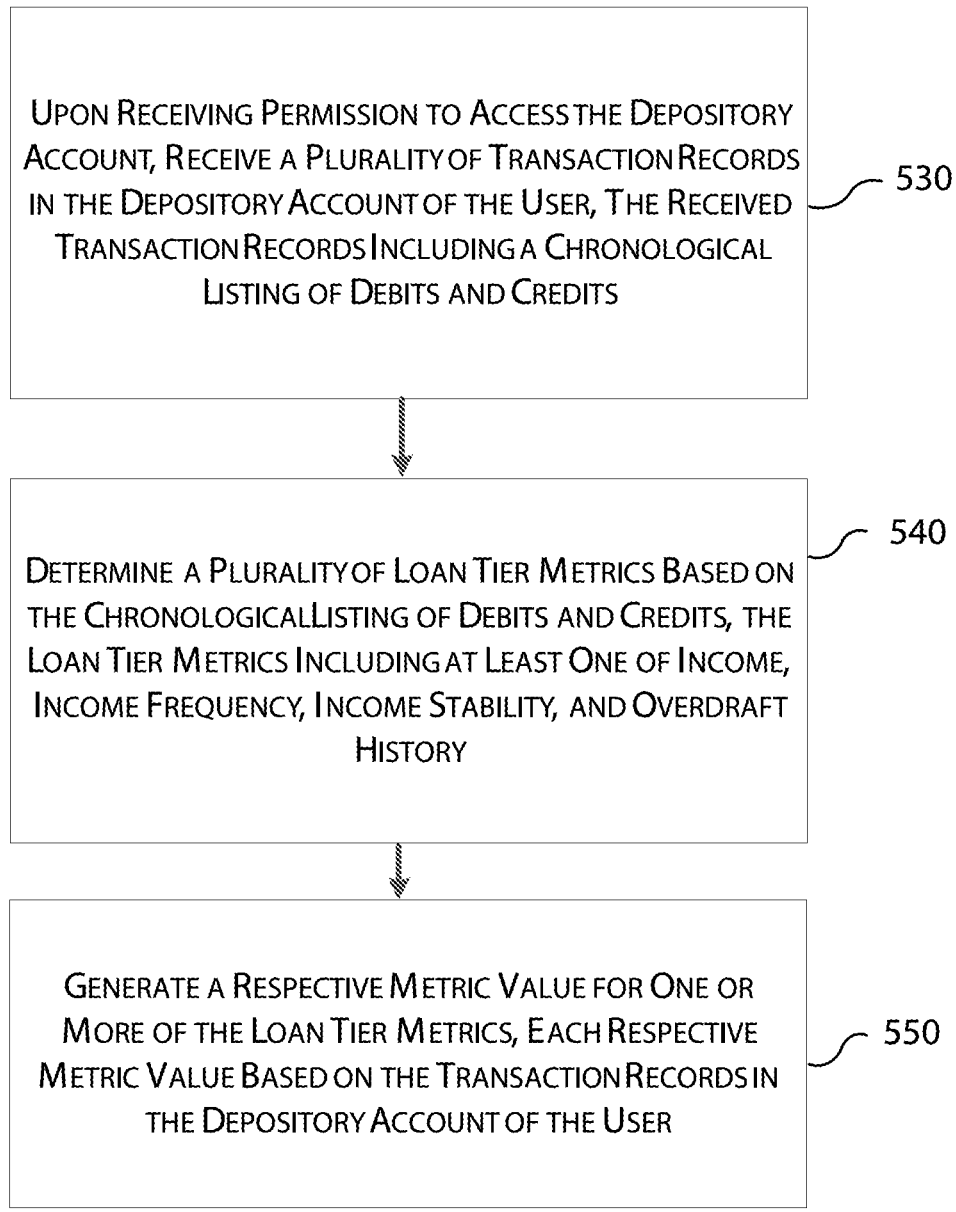
Figure 5C:
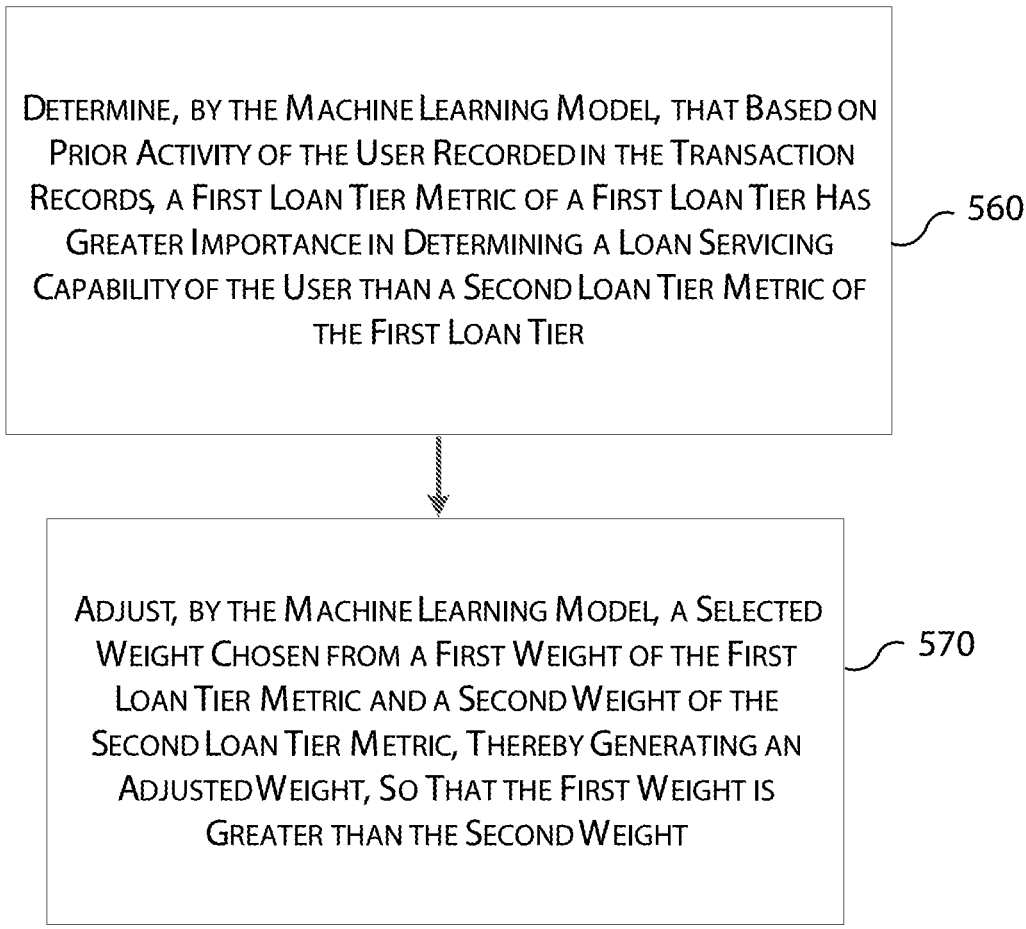
Figure 5D:
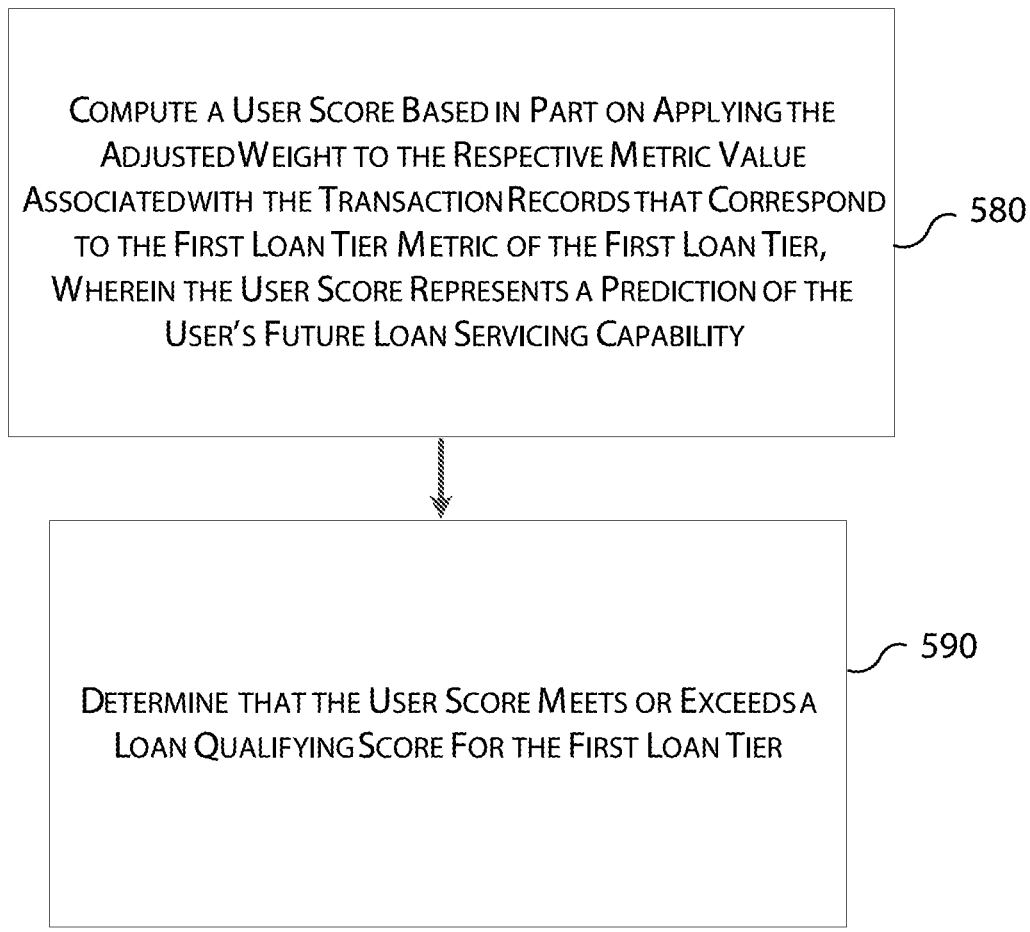

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and. including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as a display. Peripherals 405 may include removable media devices such as CD-R and DVD-R recorders/players. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

In accordance with another embodiment, an income metric is determined based on the chronological listing of transactions. The total amount of income received into the account is determined and divided by the number of months of available data. This calculation provides a monthly average income. Notably, the calculation of income is not based on identifying conventional sources of income such as payroll payments, social security payments, etc.

In one embodiment, any credit to the account greater than a predetermined amount is considered income into the account. For example, credits to the account greater than zero (0) dollars, greater than five dollars ($5), greater than ten dollars ($10), or another amount, may be counted as income.

In another embodiment, income levels are categorized into buckets associated with discrete values. For example, an income less than $1000 may be mapped to a value of zero (0), an income between $1000 and $1500 may be mapped to a value of one (1), etc.

In accordance with another embodiment, an income frequency metric is determined based on the chronological listing of transactions. All transactions that may potentially be considered as income are identified. If there are less than a predetermined number of instances of income into the account then the frequency is considered to be "NONE." In one embodiment, if there are less than six (6) instances of income into the account, then the frequency is considered to be "NONE." Other limits may be used.

If there are more than the predetermined number of instances of income into the account, then the number of days between each instance of income is determined. The income frequency is determined based on the number of days between each instance of income. Thus, the frequency may be, for example, weekly, bi-weekly, monthly, or another period such as two (2) days or nine (9) days. The frequency may alternatively be "IRREGULAR" or "NONE."

In another embodiment, income frequency values are categorized into buckets associated with discrete values. For example, "NONE" may be mapped to zero (0), "IRREGULAR" may be mapped to "1," "MONTHLY" may be mapped to "2," etc.

In accordance with another embodiment, an income stability metric is determined based on the chronological listing of transactions. Recent income during the most recent month is determined by calculating the sum of credits into the account during that period. The average monthly income over the most recent N months is determined, where N is greater than six (6). If recent income indicates at least a thirty percent (30%) decline in the monthly average income over the past 6 months, then the account is flagged as having a reduction of income and possibly job loss. Other percentage declines may be used to determine reduction of income. In one embodiment, a detected reduction of income may trigger an underwriting fail-safe, independent of the user's income level and other factors. The user is provided with a fully securitized credit offer that over time may transition to a partially secured line of credit.

In accordance with another embodiment, an overdraft history metric is determined based on the chronological listing of transactions. The current balance of the bank account is obtained. Account transactions during the most recent six (6) months are obtained and sorted in reverse order. The current balance is recursively increased or decreased based on the amount of each transaction (in reverse order). The result of each addition or subtraction is stored in an array. The array is grouped by month. The number of negative values associated with each month is determined, indicating how many times during each month the account balance was negative) This represents the number of overdrafts occurred during each month. The average number of overdrafts per month is determined over a selected number of months (e.g., six months). The average monthly number of overdrafts may be mapped to predetermined integer values, e.g., zero overdrafts may be mapped to zero (0), between one and two overdrafts may be mapped to one (1), between three and five overdrafts may be mapped to (2), etc.

It has been observed that an account owner's overdraft history bears a strong correlation to the account owner's likelihood of default. Specifically, the higher the percentage of days in which an account overdrafted, the more likely the account owner is to miss a payment, become past due, and/or have their balance charged off.

FIGS. 5A-5D include a flowchart of a method in accordance with an embodiment. At step 510, a weight is generated for one or more loan tier metrics for each of a plurality of loan tiers, each loan tier associated with a respective loan tier qualifying score. Generating the weight for a respective loan tier metric includes accessing one or more anonymized historical transaction records, training one or more machine learning models based at least on a portion of the anonymized historical transaction records, and determining the weight of the respective loan tier metric based on output from training of the one or more machine learning models. As discussed above, the system generates or receives a number of metrics and assigned weights for each of the metrics. Metrics may include one or more of, e.g.: account age, overdraft history, monthly income, income stability, income frequency, expense ratio, savings, cost of living index, etc. The system may train and use AI module 164 to determine the weights.

At step 520, an access request to access a depository account of a user is sent, the depository account hosted on a banking platform external to a source of the access request, the one or more anonymized historical transaction records originating separately from the depository account of the user. At step 530, upon receiving permission to access the depository account, a plurality of transaction records in the depository account of the user is received, the received transaction records including a chronological listing of debits and credits. As discussed above, transaction records may be stored in an account database, and retrieved from the account database by the user account platform and/or system once permission is granted.

At step 540, a plurality of loan tier metrics is determined based on the chronological listing of debits and credits, the plurality of loan tier metrics including at least one of income, income frequency, income stability, and overdraft history. In one embodiment, AI module 164 analyzes the chronological listing of debits and credits and defines loan tier metrics based on the information therein. For example, AI module 164 may determine values for a variety of features reflected in the listing of debits and credits, such as average monthly income, income frequency, income stability, overdraft history, and other features of the user's debit and credit history. Based on these values, AI module 164 may determine a plurality of loan tier metrics. In the illustrative embodiment, the loan tier metrics include income, income frequency, income stability, or overdraft history.

At step 550, a respective metric value is generated for one or more of the loan tier metrics, each respective metric value based on the transaction records in the depository account of the user. As discussed above, the system uses information from the users transaction records to calculate metric values for the loan tier metrics.

At step 560, the one or more machine learning models determine that based on prior activity of the user recorded in the transaction records, a first loan tier metric of a first loan tier has greater importance in determining a loan servicing capability of the user than a second loan tier metric of the first loan tier. For example, AI module 164 may determine that the user's overdraft history has greater importance in determining the user's loan servicing capability than other loan tier metrics.

At step 570, the one or more machine learning models adjusts a selected weight chosen from a first weight of the first loan tier metric and a second weight of the second loan tier metric, thereby generating an adjusted weight, so that the first weight is greater than the second weight. In the illustrative embodiment, AI module 164 increases the weight associated with the overdraft history metric to ensure that it has a greater weight than other metrics.

At step 580, a user score is computed based in part on applying the adjusted weight to the respective metric value associated with the transaction records that corresponds to the first loan tier metric of the first loan tier, wherein the user score represents a prediction of the user's future loan servicing capability. At step 590, a determination is made that the user score meets or exceeds a loan qualifying score for the first loan tier. As discussed above, the user score is determined and used to determine whether the user meets the qualifying score for each respective loan tier.

In accordance with an embodiment, AI module 164 includes a machine learning model that is adapted to predict parameters related to an individual's loan servicing capability. The machine learning model may be trained on training data that includes hundreds or thousands of samples of data related to various individuals' income, income frequency, income stability, and overdraft history, for example. The machine learning model may he applied to the training data and generate predictions about an individual's loan servicing capability, or generate values or metrics relating to an individual's loan servicing capability. Each prediction may be compared. to an expected result, and an error between the prediction and the expected result may be generated and fed back to the machine learning model. The machine learning model may then self-adjust based on the error information in order to improve its performance.

Figure 6:
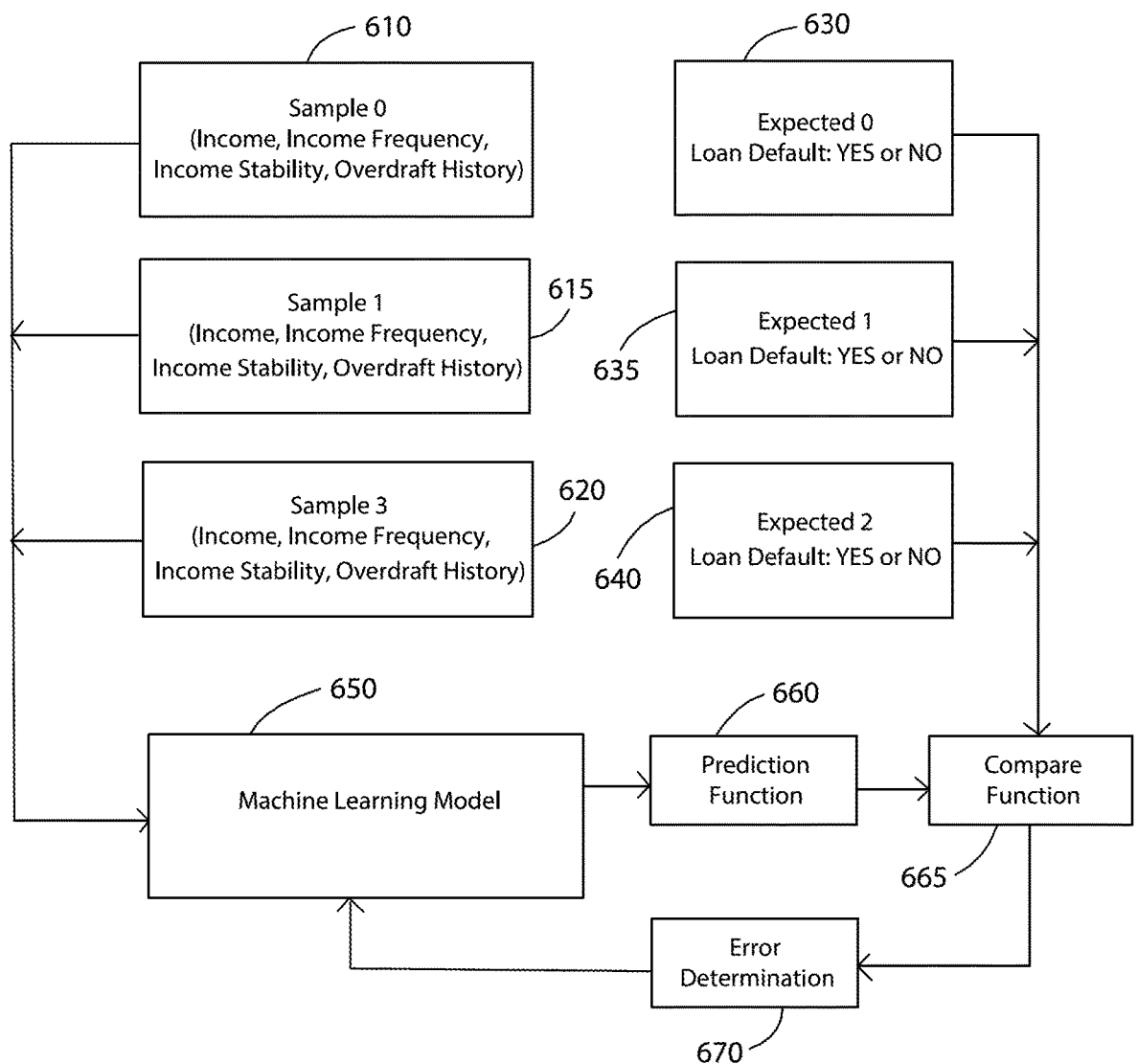
FIG. 6 includes a diagram illustrating a machine learning environment in accordance with various embodiments.

FIG. 6 is a high-level diagram illustrating the training process of a machine learning model in accordance with an embodiment. In the illustrative embodiment, sample data is iteratively fed into a machine learning model 650. The sample data includes data related to an individual's income, income frequency, income stability, overdraft history, etc. Sample data may include other types of data. For example, Thus, sample 0 (610), sample 2 (615), sample 3 (620) are iteratively provided to machine learning model 650. A prediction function 660 generates a prediction of one or more selected values or metrics, for example. The prediction may include a prediction as to how likely the individual is to default on a particular loan.

A compare function 665 compares the prediction to an expected result. In the illustrative embodiment, for each sample provided to machine learning model 650, data representing an expected result is provided to compare function 665. Thus, expected result 0 (630), expected result 1 (635), expected result 2 (640), etc. are provided. Compare function 665 compares the prediction received from prediction function 660 to the corresponding expected result. Error determination 670 generates error information indicating an error between the prediction and the expected result. The error information is fed back to machine learning model 650, which uses the error information to improve its performance.

In one embodiment, machine learning model 650 includes a formula having the following form:

$$y = w_0 x_0 + w_1 x_1 w_2 x_2 = \ldots + w_n x_n + b,$$

where y is a user score, $x_0 \ldots x_n$ represent metrics and $w_0 \ldots w_n$ are weights associated with the metrics and b is a number. In other embodiments, other formulas or relationships may be used.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating"or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for assigning a qualifying loan tier to a user based on future loan servicing capability, the method comprising:
   generating a weight for one or more loan tier metrics for each of a plurality of loan tiers, each loan tier associated with a respective loan tier qualifying score, wherein generating the weight for a respective loan tier metric comprises;
   (i) accessing one or more anonymized historical transaction records;
   (ii) training one or more machine learning models based at least on a portion of the anonymized historical transaction records;
   (iii) determining the weight of the respective loan tier metric based on output from training of the one or more machine learning models;
   sending an access request to access a depository account of a user, the depository account hosted on a banking platform external to a source of the access request, the one or more anonymized historical transaction records originating separately from the depository account of the user;
   upon receiving permission to access the depository account, receiving a plurality of transaction records in the depository account of the user, the received transaction records including a chronological listing of debits and credits;
   determining a plurality of loan tier metrics based on the chronological listing of debits and credits, the plurality of loan tier metrics including at least one of income, income frequency, income stability, and overdraft history;

generating a respective metric value for one or more of the loan tier metrics, each respective metric value based on the transaction records in the depository account of the user;

determining, by the one or more machine learning models, that based on prior activity of the user recorded in the transaction records, a first loan tier metric of a first loan tier has greater importance in determining a loan servicing capability of the user than a second loan tier metric of the first loan tier;

adjusting, by the one or more machine learning models, a selected weight chosen from a first weight of the first loan tier metric and a second weight of the second loan tier metric, thereby generating an adjusted weight, so that the first weight is greater than the second weight;

computing a user score based in part on applying the adjusted weight to the respective metric value associated with the transaction records that corresponds to the first loan tier metric of the first loan tier, wherein the user score represents a prediction of the user's future loan servicing capability; and determining that the user score meets or exceeds a loan qualifying score for the first loan tier.

2. The method of claim 1, further comprising:
determining one or more patterns of activity based on the plurality of transaction records; and determining, by the one or more machine learning models, the plurality of loan tier metrics based on the one or more patterns of activity.

3. The method of claim 1, further comprising:
determining, by the one or more machine learning models, that based on prior activity of the user recorded in the transaction records, the overdraft history has a greatest importance in determining a loan servicing capability of the user than one or more other loan tier metrics of the first loan tier; and adjusting, by the one or more machine learning models, a first weight associated with the overdraft history so that the first weight is greater than one or more second weights associated with the one or more other loan tier metrics.

4. The method of claim 1, wherein the one or more loan tier metrics include monthly income, wherein determining monthly income includes dividing a total amount of income received in the account over N months by N, wherein N is a selected number.

5. The method of claim 1, wherein the one or more loan tier metrics include income frequency, wherein determining income frequency includes identifying a plurality of second transactions that represent income and determining an average number of days between the second transactions.

6. The method of claim 1, wherein the one or more loan tier metrics include income stability, wherein determining income stability includes determining a first amount of income during a recent month, determining an average monthly amount of income over N months, wherein N is a selected number, and determining whether the first amount represents a decline exceeding a predetermined percentage of the average monthly amount of income.

7. The method of claim 1, wherein the one or more loan tier metrics include overdraft history, wherein determining overdraft history includes sorting the transaction records in reverse order, applying the transaction records in reverse order to a balance of the depository account, determining a number of times the balance is negative, and determining an average number of overdrafts per month based on the number of times the balance is negative.

8. The method of claim 1, further comprising training the one or more machine learning models by iteratively performing a series of steps comprising:
feeding to the one or more machine learning models sample data related to one or more of income of one or more customers, income frequency of one or more customers, income stability of one or more customers, and overdraft history of one or more customers;
generating, by the one or more machine learning models, a prediction related to a loan servicing ability of a customer;
determining an expected result associated with the loan servicing ability of the customer;
comparing the prediction to the expected result;
generating error information based on the comparison; and
feeding the error information to the one or more machine learning models.

9. A system comprising:
a processor adapted to:
send an access request to access a depository account of a user, the depository account hosted on a banking platform external to a source of the access request, the one or more anonymized historical transaction records originating separately from the depository account of the user; and
upon receiving permission to access the depository account, receive a plurality of transaction records in the depository account of the user, the received transaction records including a chronological listing of debits and credits; and
one or more machine learning model adapted to:
receive one or more anonymized historical transaction records;
train on at least on a portion of the anonymized historical transaction records, thereby generating training output; and
generate a weight for one or more loan tier metrics for each of a plurality of loan tiers based on the training output, each loan tier associated with a respective loan tier qualifying score;
determine a plurality of loan tier metrics based on the chronological listing of debits and credits, the plurality of loan tier metrics including at least one of income, income frequency, income stability, and overdraft history;
generate a respective metric value for one or more of the loan tier metrics, each respective metric value based on the transaction records in the depository account of the user;
determine that based on prior activity of the user recorded in the transaction records, a first loan tier metric of a first loan tier has greater importance in determining a loan servicing capability of the user than a second loan tier metric of the first loan tier;
adjust a selected weight chosen from a first weight of the first loan tier metric and a second weight of the second loan tier metric, thereby generating an adjusted weight, so that the first weight is greater than the second weight;
compute a user score based in part on applying the adjusted weight to the respective metric value associated with the transaction records that corresponds to the first loan tier metric of the first loan tier, wherein the user score represents a prediction of the user's future loan servicing capability; and determine that the user score meets or exceeds a loan qualifying score for the first loan tier.

10. The system of claim 9, wherein the one or more machine learning models are further adapted to:
   determine one or more patterns of activity based on the plurality of transaction records; and determine the plurality of loan tier metrics based on the one or more patterns of activity.

11. The system of claim 9, wherein the one or more machine learning models are further adapted to:
   determine that based on prior activity of the user recorded in the transaction records, the overdraft history has a greatest importance in determining a loan servicing capability of the user than one or more other loan tier metrics of the first loan tier; and
   adjust, by the one or more machine learning models, a first weight associated with the overdraft history so that the first weight is greater than one or more second weights associated with the one or more other loan tier metrics.

12. The system of claim 9, wherein the one or more loan tier metrics include monthly income, wherein determining monthly income includes dividing a total amount of income received in the account over N months by N, wherein N is a selected number.

13. The system of claim 9, wherein the one or more loan tier metrics include income frequency, wherein determining income frequency includes identifying a plurality of second transactions that represent income and determining an average number of days between the second transactions.

14. The system of claim 9, wherein the one or more loan tier metrics include income stability, wherein determining income stability includes determining a first amount of income during a recent month, determining an average monthly amount of income over N months, wherein N is a selected number, and determining whether the first amount represents a decline exceeding a predetermined percentage of the average monthly amount of income.

15. The system of claim 9, wherein the one or more loan tier metrics include overdraft history, wherein determining overdraft history includes sorting the transaction records in reverse order, applying the transaction records in reverse order to a balance of the depository account, determining a number of times the balance is negative, and determining an average number of overdrafts per month based on the number of times the balance is negative.

16. The system of claim 9, wherein training of the one or more machine learning models further comprises:
   iteratively performing a series of steps comprising:
      feeding to the one or more machine learning models sample data related to one or more of income of one or more customers, income frequency of one or more customers, income stability of one or more customers, and overdraft history of one or more customers;
      generating, by the one or more machine learning models, a prediction related to a loan servicing ability of a customer;
      determining an expected result associated with the loan servicing ability of the customer;
      comparing the prediction to the expected result;
      generating error information based on the comparison; and
      feeding the error information to the one or more machine learning models.

17. A non-transitory computer readable medium having stored thereon software instructions that, when executed by a processor, cause the processor to perform a series of operations comprising:
   generating a weight for one or more loan tier metrics for each of a plurality of loan tiers, each loan tier associated with a respective loan tier qualifying score, wherein generating the weight for a respective loan tier metric comprises;
   (i) accessing one or more anonymized historical transaction records;
   (ii) training one or more machine learning models based at least on a portion of the anonymized historical transaction records;
   (iii) determining the weight of the respective loan tier metric based on output from
   training of the one or more machine learning models;
   sending an access request to access a depository account of a user, the depository account hosted on a banking platform external to a source of the access request, the one or more anonymized historical transaction records originating separately from the depository account of the user;
   upon receiving permission to access the depository account, receiving a plurality of transaction records in the depository account of the user, the received transaction records including a chronological listing of debits and credits;
   determining a plurality of loan tier metrics based on the chronological listing of debits and credits, the plurality of loan tier metrics including at least one of income, income frequency, income stability, and overdraft history;
   generating a respective metric value for one or more of the loan tier metrics, each respective metric value based on the transaction records in the depository account of the user;
   determining, by the one or more machine learning models, that based on prior activity of the user recorded in the transaction records, a first loan tier metric of a first loan tier has greater importance in determining a loan servicing capability of the user than a second loan tier metric of the first loan tier;;
   adjusting, by the one or more machine learning models, a selected weight chosen from a first weight of the first loan tier metric and a second weight of the second loan tier metric, thereby generating an adjusted weight, so that the first weight is greater than the second weight;
   computing a user score based in part on applying the adjusted weight to the respective metric value associated with the transaction records that corresponds to the first loan tier metric of the first loan tier, wherein the user score represents a prediction of the user's future loan servicing capability; and
   determining that the user score meets or exceeds a loan qualifying score for the first loan tier.

18. The non-transitory computer readable medium of claim 17, wherein the series of operations further comprises:
   determining one or more patterns of activity based on the plurality of transaction records; and determining, by the one or more machine learning models, the plurality of loan tier metrics based on the one or more patterns of activity.

19. The non-transitory computer readable medium of claim 17, wherein the series of operations further comprises:
   determining, by the one or more machine learning models, that based on prior activity of the user recorded in the transaction records, the overdraft history has a greatest importance in determining a loan servicing capability of the user than one or more other loan tier metrics of the first loan tier; and adjusting, by the one or more machine learning models, a first weight associated with the overdraft history so that the first weight is greater than one or more second weights associated with the one or more other loan tier metrics.

20. The non-transitory computer readable medium of claim 17, wherein the series of operations further comprises:

feeding to the one or more machine learning models sample data related to one or more of income of one or more customers, income frequency of one or more customers, income stability of one or more customers, and overdraft history of one or more customers;

generating, by the one or more machine learning models, a prediction related to a loan servicing ability of a customer;

determining an expected result associated with the loan servicing ability of the customer;

comparing the prediction to the expected result;

generating error information based on the comparison; and feeding the error information to the one or more machine learning models.

* * * * *